(12) United States Patent  
White et al.

(10) Patent No.: US 10,183,496 B2
(45) Date of Patent: *Jan. 22, 2019

(54) INK JET PRINTING WITH HIGH DROP WEIGHT (HDW) PLANES AND LOW DROP WEIGHT (LDW) PLANES

(71) Applicant: HEWLETT-PACKARD DEVELOPMENT COMPANY, L.P., Houston, TX (US)

(72) Inventors: Lawrence H White, Corvallis, OR (US); Arun K Agarwal, Corvallis, OR (US); Ron Burns, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/521,587

(22) PCT Filed: Oct. 30, 2014

(86) PCT No.: PCT/US2014/063189
§ 371 (c)(1),
(2) Date: Apr. 24, 2017

(87) PCT Pub. No.: WO2016/068949
PCT Pub. Date: May 6, 2016

(65) Prior Publication Data
US 2017/0313099 A1 Nov. 2, 2017

(51) Int. Cl.
*B41J 2/21* (2006.01)
*B41J 2/175* (2006.01)
*H04N 1/405* (2006.01)

(52) U.S. Cl.
CPC ............. *B41J 2/2103* (2013.01); *B41J 2/175* (2013.01); *B41J 2/2121* (2013.01); *B41J 2/2146* (2013.01); *H04N 1/4057* (2013.01)

(58) Field of Classification Search
CPC ...................................................... B41J 2/2103
See application file for complete search history.

(56) References Cited

U.S. PATENT DOCUMENTS 5,412,410 A  5/1995  Rezanka
5,745,131 A * 4/1998 Kneezel ................. B41J 2/2125
                                                                    347/15

(Continued)

FOREIGN PATENT DOCUMENTS

CN   101495318   7/2009
JP   09-207359   8/1997

(Continued)

*Primary Examiner* — Bradley Thies
(74) *Attorney, Agent, or Firm* — International IP Law Group PLLC (57) ABSTRACT

Printing methods and systems are described herein. In one example, a method includes rasterizing a document to create color rasters and linearizing the color rasters to create high drop weight (HDW) planes and low drop weight (LDW) planes. HDW and LDW halftone planes are created from the HDW and LDW planes. The HDW and LDW halftone planes are masked to create HDW and LDW printhead maps, and the HDW and LDW printhead maps are merged into print data. The print data is sent to a number of printheads.

20 Claims, 10 Drawing Sheets

(56) References Cited

U.S. PATENT DOCUMENTS

| | | | |
|---|---|---|---|
| 6,328,399 B1 * | 12/2001 | Wen | B41J 2/04581 |
| | | | 347/15 |
| 6,511,143 B1 | 1/2003 | Ishikawa et al. | |
| 6,527,369 B1 | 3/2003 | Weber et al. | |
| 6,557,976 B2 | 5/2003 | Weber | |
| 6,585,352 B1 | 7/2003 | Torgerson et al. | |
| 6,773,089 B2 | 8/2004 | Inoue et al. | |
| 6,959,979 B2 | 11/2005 | Goin et al. | |
| 7,887,159 B2 | 2/2011 | Takei et al. | |
| 8,087,759 B2 | 1/2012 | Oikawa et al. | |
| 8,231,203 B2 | 7/2012 | Akama et al. | |
| 8,794,745 B2 | 8/2014 | Yamane et al. | |
| 2003/0021470 A1 | 1/2003 | Kakutani | |
| 2003/0095159 A1 | 5/2003 | Hotomi | |
| 2004/0027416 A1 * | 2/2004 | Rosenberger | H04N 1/54 |
| | | | 347/43 |
| 2004/0165033 A1 * | 8/2004 | Chikuma | B41J 2/04551 |
| | | | 347/41 |
| 2013/0021411 A1 | 1/2013 | Feinn et al. | |
| 2014/0375710 A1 * | 12/2014 | Blair | B41J 2/07 |
| | | | 347/9 |

FOREIGN PATENT DOCUMENTS

| | | |
|---|---|---|
| WO | WO-2011123120 | 3/2010 |
| WO | WO-2013187909 | 12/2013 |

* cited by examiner

INK JET PRINTING WITH HIGH DROP WEIGHT (HDW) PLANES AND LOW DROP WEIGHT (LDW) PLANES

BACKGROUND

Thermal ink jet printheads are fabricated on integrated circuit wafers. Drive electronics and control features are first fabricated, then the columns of heater resistors are added and finally the structural layers, for example, formed from photoimageable epoxy, are added, and processed to form the drop generators. The drop size for print heads is often uniform. However, this makes the high speed printing of documents problematic, as large drops, which can print at higher speed, do not resolve images as well. Printheads could be switched out by job, but a web press can have hundreds of printheads, making this option difficult.

BRIEF DESCRIPTION OF THE DRAWINGS

Certain examples are described in the following detailed description and in reference to the drawings, in which.

DETAILED DESCRIPTION OF SPECIFIC EXAMPLES

Ink jet printheads that are designed to produce two drop sizes, termed interstitial dual drop weight (iDDW), are described in examples herein. The ink jet printheads alternate the sizes of drop generators, including the heater resistors and nozzles. As used herein, a drop generator is an apparatus that ejects an ink drop at a print medium. The drop generator includes an inflow region comprising a flow chamber that fluidically couples an ink source with an ejection chamber. The ejection chamber has a heating resistor on a surface, and a nozzle disposed proximate the heating resistor. When a firing pulse is applied to the heating resistor, a steam or solvent bubble is formed within the ejection chamber, which forces an ink drop out the nozzle.

Each printhead has multiple columns, or arrays, of drop generators that alternate between high drop weight (HDW) and low drop weight (LDW). The HDW may be in the range of about 6-11 nanograms (ng), or about 9 ng, while the LDW may be in the range of about 3-5 ng, or about 4 ng. The drop generators share the same stack thickness for the fluidic, or ink flow, channels, and are centered on substantially the same pitch to assure correct drop placement, e.g., about 21.2 micrometers (µm) for 1200 dots per inch (dpi).

The ink jet printheads provide high speed printing for text and graphics and lower speed printing, with increased quality and reduced drop weight, for images. In an example, a control system may determine which type of drop generator to use depending on the input. The control system may use only the HDW drop generators for high speed printing of text and graphics, all LDW drop generators for high quality printing of images, or a mixture of LDW drop generators and HDW drop generators for general purpose use.

Further, in some examples, the printed drop shapes and printhead layout are improved by using a non-circular bore (NCB) for the nozzle of the HDW drop generator and a circular bore for the nozzle of the LDW drop generator. The NCB allows the bore area necessary for a HDW drop generator to fit within available space in the Y axis of the printhead while also reducing the drop tail length, which gives crisp edges to lines and text. The circular bore used on the nozzle of the LDW drop generator packs well between the adjacent NCBs of the nozzles for the HDW drop generators and produces a longer drop tail that splits into two, or more, smaller drops. These small drops are ideal for reducing grain in images.

Figure 1:
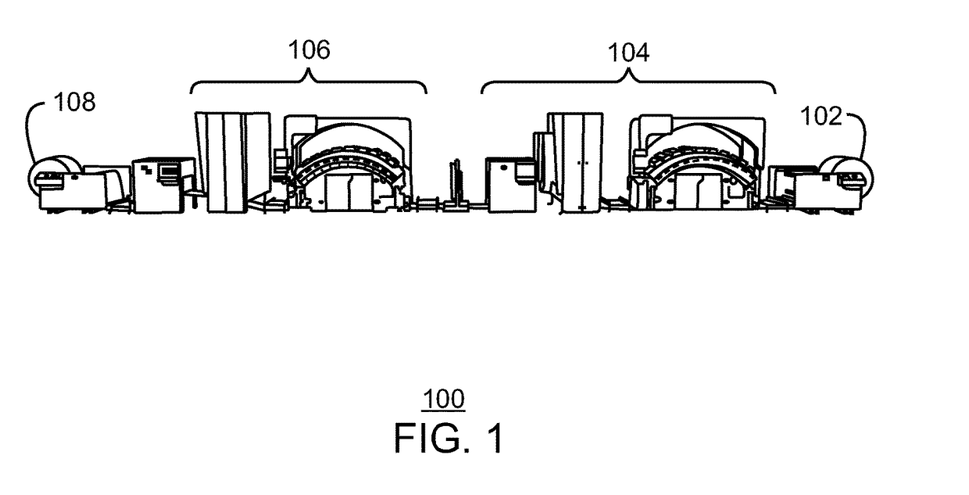
FIG. 1 is a drawing of an example printing press that uses ink jet printheads to form images on a print medium.

FIG. 1 is a drawing of an example of a printing press 100 that uses ink jet printheads to form images on a print medium. The printing press 100 can feed a continuous sheet of paper from a large roll 102. The paper can be fed through a number of printing systems, such as printing systems 104 and 106. In the first printing system 104 a printbar that houses a number of printheads ejects ink drops onto the paper. Printheads in the second printing system 106 may be used to print additional colors. For example, the first system 104 may print black (K), while the second system 106 may print cyan, magenta, and yellow (CMY). The printing systems 104 and 106 are not limited to two, or the mentioned color combinations, as any number of systems may be used, depending, for example, on the colors desired and the speed of the printing press 100.

After the second system 106, the printed paper may be taken up on a take-up roll 108 for later processing. In some examples, other units may replace the take-up roll 108, such as a sheet cutter and binder, among others. The printing press 100 may have a very high speed of operation and printing, and, thus, the design of the printheads may be important to achieving this speed. In one example, the paper, or other print medium, may be moving as fast as about 800 feet per minute, or about 244 meters per minute. Further, the printing press 100 may print about 129 million letter-sized images per month. The techniques described herein are not limited to the printing press 100 of FIG. 1, but may be used with any ink jet printing system, for example, from a personal printer to the printing press 100.

Figure 2A:
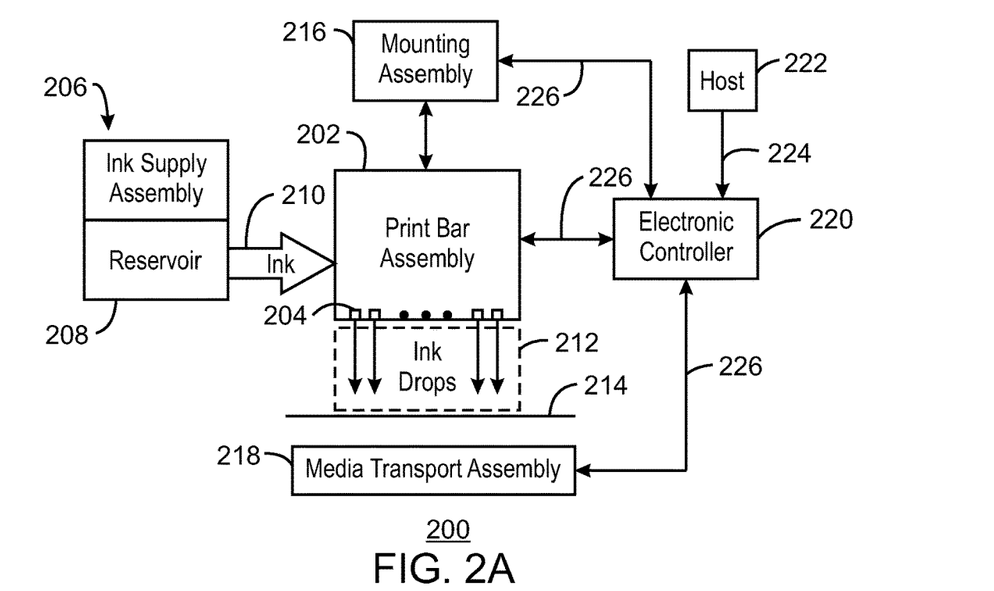
FIGS. 2A and 2B are block diagrams of an example of a printing system that may be used to form images using ink jet printheads.

FIGS. 2A and 2B are block diagrams of an example of a printing system 200 that may be used to form images using ink jet printheads. As shown in FIG. 2A, the printing system 200 includes a printbar 202, which includes a number of printheads 204, and an ink supply assembly 206. The ink supply assembly 206 includes an ink reservoir 208. From the ink reservoir 208, ink 210 is provided to the printbar 202 to be fed to the printheads 204. The ink supply assembly 206 and printbar 202 may use a one-way ink delivery system or a recirculating ink delivery system. In a one-way ink delivery system, substantially all of the ink supplied to the printbar 202 is consumed during printing. In a recirculating ink delivery system, a portion of the ink 210 supplied to the printbar 202 is consumed during printing, and another portion of the ink is returned to ink supply assembly. In an example, the ink supply assembly 206 is separate from the printbar 202, and supplies the ink 210 to the printbar 202 through a tubular connection, such as a supply tube (not shown). In other examples, the printbar 202 may include the ink supply assembly 206, and ink reservoir 208, along with a printhead 202, for example, in single user printers. In either example, the ink reservoir 208 of the ink supply assembly 206 may be removed and replaced, or refilled.

From the printheads 204 the ink 210 is ejected from nozzles as ink drops 212 towards a print medium 214, such as paper, Mylar, cardstock, and the like. In some example, other media, such as treated papers that enhance adhesion, may be used. The nozzles of the printheads 204 are arranged in one or more columns or arrays such that properly sequenced ejection of ink 210 can form characters, symbols, graphics, or other images to be printed on the print medium 214 as the printbar 202 and print medium 214 are moved relative to each other. The ink 210 is not limited to colored liquids used to form visible images on paper. For example, the ink 210 may be an electro-active substance used to print circuits and other items, such as solar cells. Further, other types of materials, such as metallic or magnetic inks 210 may be used. In some examples, the printing system 200 may be used for other types of applications, such as three dimensional printing and digital titration, among others. In those examples, the inks 210 can encompass any number of other chemicals, such as acids, bases, plastic fluids, medical testing fluids, and the like.

In examples described herein, the printheads 204 have an iDDW design. In the iDDW design, one of two different sized ink drops 212 may be ejected from the printheads 204 depending on the types of images to be printed. It is desirable for the ink jet printing system 200 to maintain a high printing speed, and, thus, the printheads 204 may be designed to provide a similar speed for printing using each drop size. However, in some examples, the printing speed may be adjusted depending on the ratio of the types of drops, e.g., HDW to LDW.

A mounting assembly 216 may be used to position the printbar 202 relative to the print medium 214. In an example, the mounting assembly 216 may be in a fixed position, holding a number of printheads 204 above the print medium 214. In another example, the mounting assembly 216 may include a motor that moves the printbar 202 back and forth across the print medium 214, for example, if the printbar 202 only included one to four printheads 204. A media transport assembly 218 moves the print medium 214 relative to the printbar 202, for example, moving the print medium 214 perpendicular to the printbar 202. In the example of FIG. 1, the media transport assembly 218 may include the rolls 102 and 108, as well as any number of motorized pinch rolls used to pull the paper through the printing systems 104 and 106. If the printbar 202 is moved, the media transport assembly 218 may index the print medium 214 to new positions. In examples in which the printbar 202 is not moved, the media transport assembly 218 may move the print medium 214 continuously.

A controller 220 receives data from a host system 222, such as a computer. The data may be transmitted over a network connection 224, which may be an electrical connection, an optical fiber connection, or a wireless connection, among others. The data 220 may include a document or file to be printed, or may include more elemental items, such as a color plane of a document or a rasterized document. The controller 220 may temporarily store the data in a local memory for analysis. The analysis may include determining timing control for the ejection of ink drops from the printheads 204, as well as the motion of the print medium 202 and any motion of the printbar 202. The controller 220 may operate the individual parts of the printing system over control lines 226. Accordingly, the controller 220 defines a pattern of ejected ink drops 212 which form characters, symbols, graphics, or other images on the print medium 214. For example, the controller 220 may determine when to use HDW drop generators and LDW drop generators for printing a particular image, as described further with respect to FIG. 2B.

The ink jet printing system 200 is not limited to the items shown in FIG. 2. For example, the controller 220 may be a cluster computing system coupled in a network that has separate computing controls for individual parts of the system. For example, a separate controller may be associated with each of the mounting assembly 216, the printbar 202, the ink supply assembly 206, and the media transport assembly 218. In this example, the control lines 226 may be network connections coupling the separate controllers into a single network. In other examples, the mounting assembly 216 may not be a separate item from the printbar 202, for example, if the printbar 202 is fixed in place.

Figure 2B:
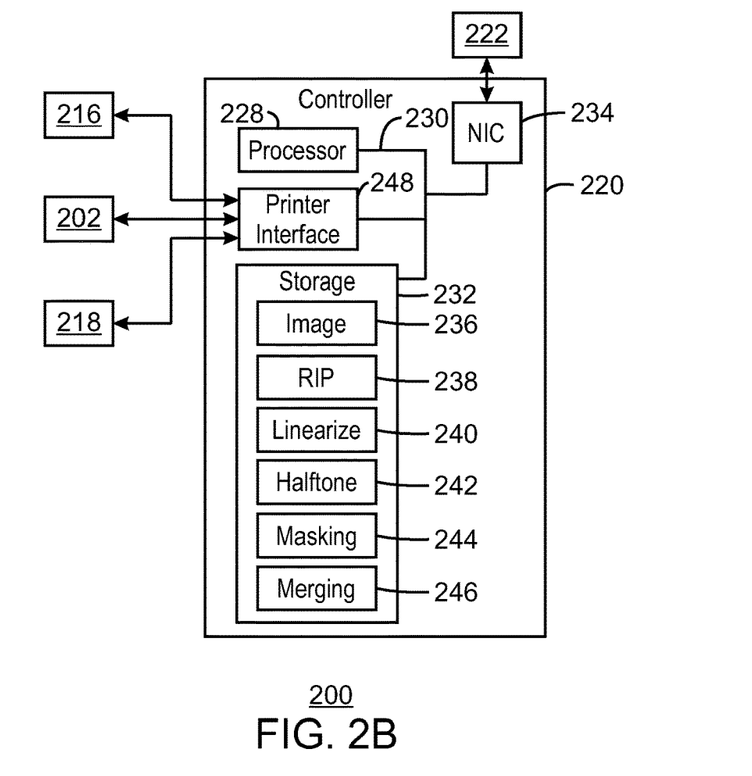

FIG. 2B is a block diagram of the controller 220 of FIG. 2A. The controller 220 may have a processor 228 that is configured to execute stored instructions, coupled though a bus 230 to a storage device 232 that stores instructions that are executable by the processor 228. The processor 228 can be a single core processor, a multi-core processor, a computing cluster, or any number of other configurations. As used herein, the storage device 232 is a non-transitory, machine readable medium. The storage device 234 may include both short term and long term storage. The short term storage may include random access memory (RAM), dynamic random access memory (DRAM), flash memory, or any other suitable memory systems, as well as any combinations thereof. The long term storage may include read only memory (ROM), a RAM drive, non-volatile RAM, a hard drive, an optical drive, a thumb drive, an array of drives, a remote array of drives, or any other suitable systems, as well as any combinations thereof.

A network interface controller (NIC) 234 may be coupled to the processor 228 through the bus 230. The NIC 234 may couple the controller 220 to the host 222 through a network, such as a local area network (LAN), a wide area network (WAN), or the Internet, among others.

The storage device 232 may include a number of modules, or blocks of code, used to provide functionality to the ink jet printing system 200. An image module 236 may direct the processor 238 to obtain and store an image, such as a document, from the host 222. The image may be a picture, a text document, a portable document format (PDF) file, or any number of other files.

A Raster Image Processor (RIP) module 238 includes code to direct the processor to rasterize the image. The rasterization divides the image into layers, or rasters, wherein each raster represents a color of ink, that when combined, will give the initial image color. For example, one rasterization technique divides the image into CMYK rasters. CMYK represents cyan, magenta, yellow, and black rasters. The CMYK rasters may be used to represent all colors in a cost effective manner. Other raster schemes may be used, such as six plane schemes that use specialty colors to enhance image reproduction. For example, one such scheme, termed Hexachrome, adds orange and green inks to the standard CMYK palette to enhance the appearance of the printed document.

A linearization module 240 uses one dimensional tables to divide each raster into two planes, one plane representing the HDW drops, and one plane representing the LDW drops. The one dimensional table may be formed as described with respect to FIG. 8.

A halftoning module 242 uses a breakpoint table to convert the continuous color tone of each plane into individual drops. For example, the breakpoint table may represent intensity levels over a certain area of the plane that correspond to no ink drop, one ink drop, or two ink drops.

A masking module 244 divides the drops of the halftones planes among the printbar 202, and printheads 204. This creates a map of the print output. A printing module 246 then merges the LDW planes with the HDW planes for each color, and sends the resulting control data to the printbars 202 and printheads 204. For example, the processor 228 may send the control data over a printer interface 248 coupled to the bus 230.

The controller 220 for the ink jet printing system 200 is not limited to the configurations described with respect to FIG. 2B, but may include any number of other configurations. For example, the code of the modules may be arranged in any number of other configurations while retaining the same general function. In another example, the modules may be shifted off of the controller 220, and may be run remotely, such as by the host 222.

Figure 3:
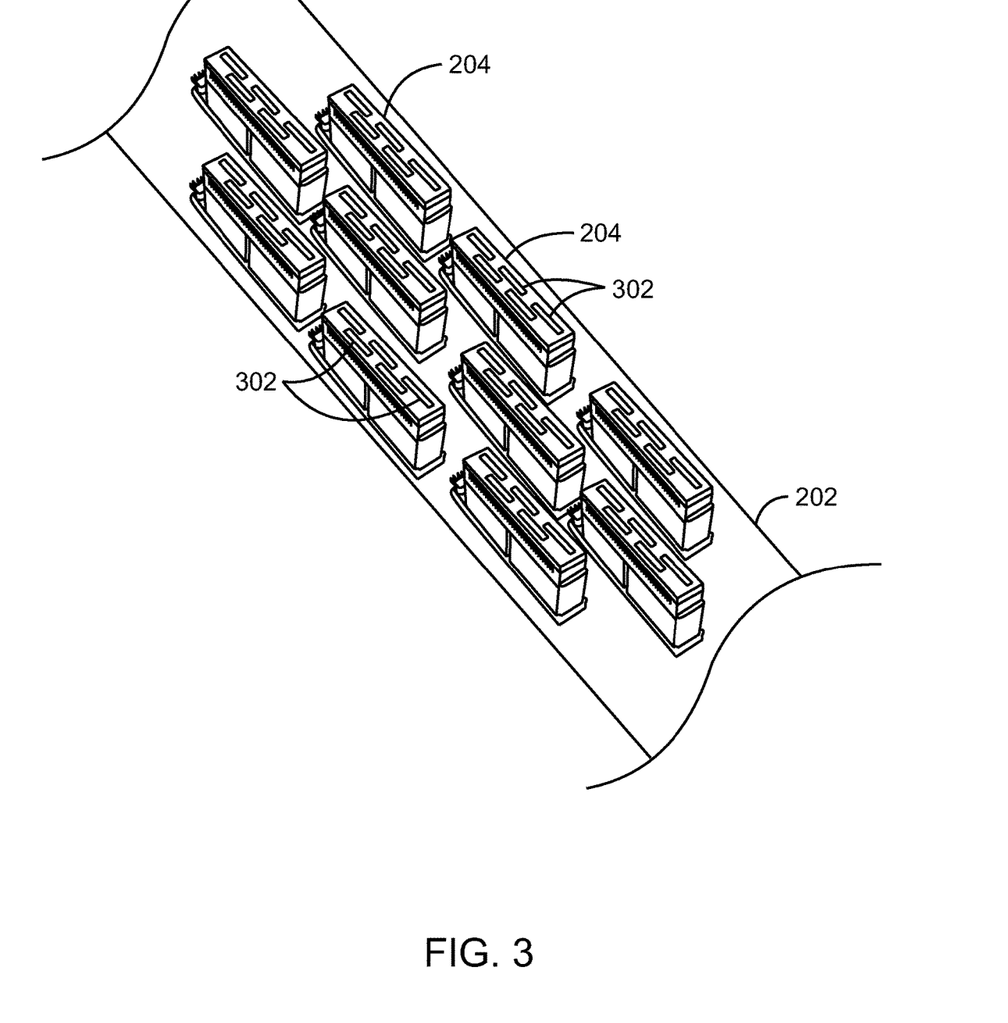
FIG. 3 is a drawing of a cluster of ink jet printheads in an example print configuration, for example, in a printbar.

FIG. 3 is a drawing of a cluster of ink jet printheads 204 in an example print configuration, for example, in a printbar 202. Like numbered items are as described with respect to FIG. 2. The printbar 202 shown in FIG. 3 may be used in configurations that do not move the printhead. Accordingly, the printheads 204 may be attached to the printbar 202 in an overlapping configuration to give complete coverage. Each printhead 204 has multiple nozzle regions 302, such as columns of nozzles that alternate HDW drop generators and LDW drop generators.

Figure 4:
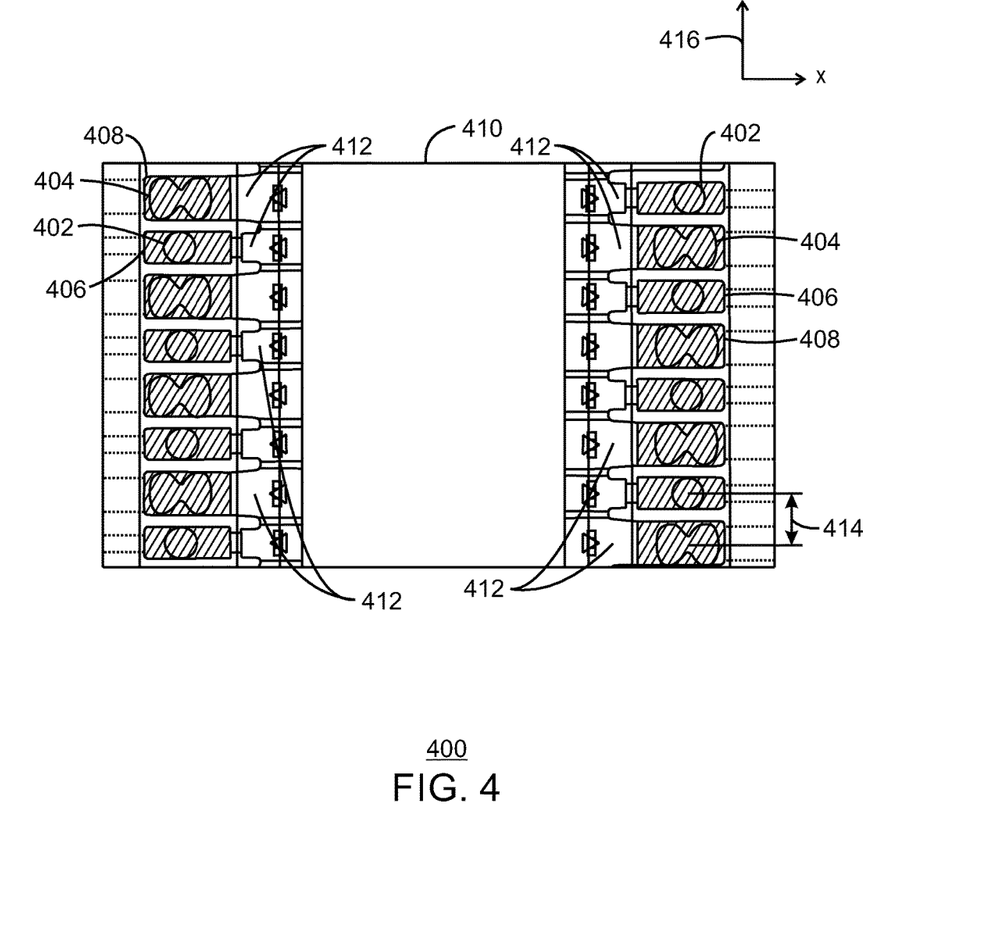
FIG. 4 is a top view of an example printhead showing adjacent nozzles over resistors.

FIG. 4 is a top view of an example printhead 400 showing adjacent nozzles 402 and 404 over resistors 406 and 408, respectively. For simplicity, only a representative sample of each of the nozzles 402 and 404 and resistors 406 and 408 are labeled. A smaller nozzle 402 is located over a narrower resistor 406 to provide the LDW drop, for example, about 4 nanograms (ng) in weight. A larger nozzle 404 is located over a wider resistor 408 to provide the HDW drop, for example, about 9 ng in weight. An ink refill region 410 is coupled to each nozzle 402 and 404 through an inflow region 412. To simplify the drawing, only a portion of the inflow regions are labeled.

The resistor pitch 414 may constant, for example, at about 21.1 μm in the y-direction 416, corresponding to about 1200 dots per inch (dpi), in order to assure correct drop placement. An HDW drop generator includes a larger nozzle 404, a wider resistor 408, an ejection chamber located proximate to the nozzle and resistor, and an associated inflow region 412. An LDW drop generator includes a smaller nozzle 402, a narrower resistor 406, an ejection chamber located proximate to the nozzle and resistor, and an associated inflow region 412.

Although the HDW and LDW drop generators differ from conventional designs, the process of making the printhead 400 is similar to many inkjet printheads. The drive transistors and control electronics are first fabricated by conventional semiconductor processes. A layer of conductor is deposited over the wafer, and etched to form resistor windows. A layer of resistor material is deposited over the conductor layer and resistor windows, and is masked and etched to form traces and resistors 406 and 408. After the formation of the traces and resistors 406 and 408, protective layers may be deposited and then layers of photoimageable epoxy can be applied and imaged to form a base, flow channels, ejection chambers over the resistors 406 and 408, and nozzles 402 and 408 over the ejection chambers.

Figure 5:
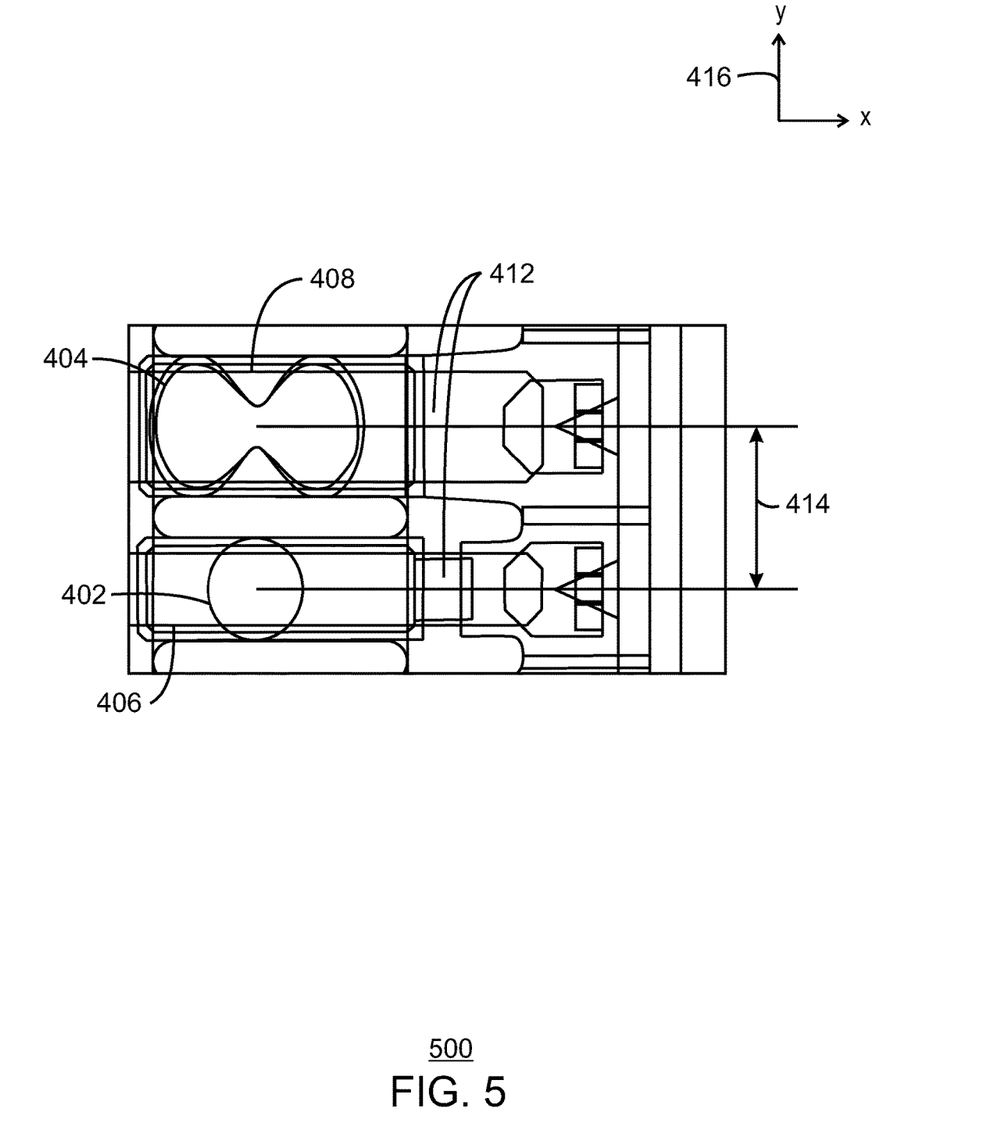
FIG. 5 is a close up top view of two drop generators, showing the different nozzle designs.

FIG. 5 is a close up top view 500 of two drop generators, showing the different nozzle designs. Like numbered items are as described with respect to FIG. 4. In examples described herein, the layout of the top layer, e.g., the nozzles 402 and 404, is used to create a printhead that can print multiple drop sizes on pitch. As described herein, the drop weight and drop velocity are dependent upon the interaction of the area of the resistors 406 and 408 and the bore, or area, of the nozzles 402 and 404. For example, a bore for a 9-10 ng drop is in the range of between about 280 to 340 $\mu m^2$ while a bore for a 3-4 ng drop is between about 160 to 200 $\mu m^2$. If the nozzles were circular, the diameters would be about 19-20 μm and 12-14 μm respectively. As the wall between each drop generator is about 5 μm, the spacing for a 21.5 μm pitch would be about 32 μm. The diameters described above would not fit within this measurement.

However, the use of a two-lobed polynomial ellipse as a non-circular bore (NCB) for the nozzle 404 of the HDW drop generator reduces the extent of the bore in the y direction 416, allowing the nozzle 404 to fit on the pitch. Further, the location of the smaller circular bore (CB) of the nozzle 402 for the LDW drop generator falls in a position that maximizes the space between the nozzles 402 and 404. This increases the mechanical strength of the structure and limits fluidic interactions between the nozzles 402 and 404.

Figure 6A:
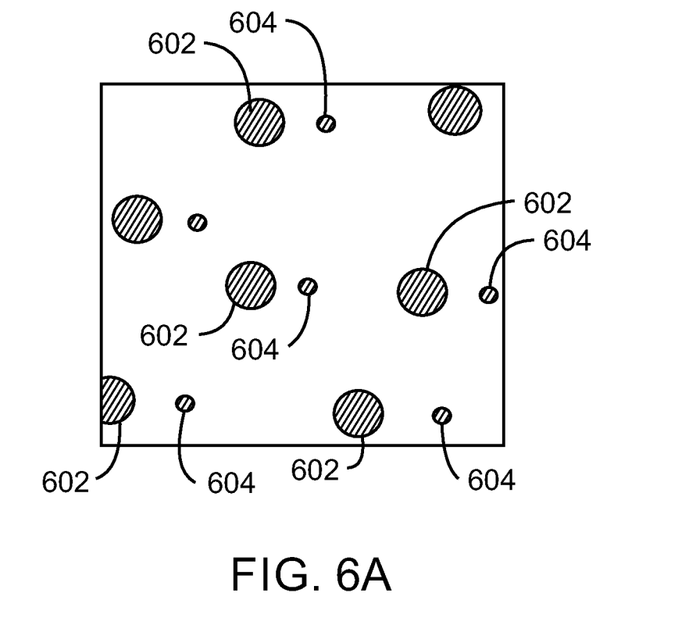
FIGS. 6A and 6B are drawings of the dot patterns from the nozzles described with respect to FIG. 5.

FIGS. 6A and 6B are drawings of the dot patterns from the nozzles described with respect to FIG. 5. Referring also to FIG. 5, the HDW nozzle 404 provides the drop pattern shown in FIG. 6A. The NCB gives a large main drop 602 with small satellite drop 604. This arrangement is desirable for text and graphics, since it may provide sharp edges to lines. An HDW drop produced by the NCB has much less relative ink volume in tail drops, providing better, sharper edges. Further, the thermal limit on printing speed is more a function of drops per second than ink volume per second. Thus, printing with the HDW drop generator gives more ink flux capability.

Figure 6B:
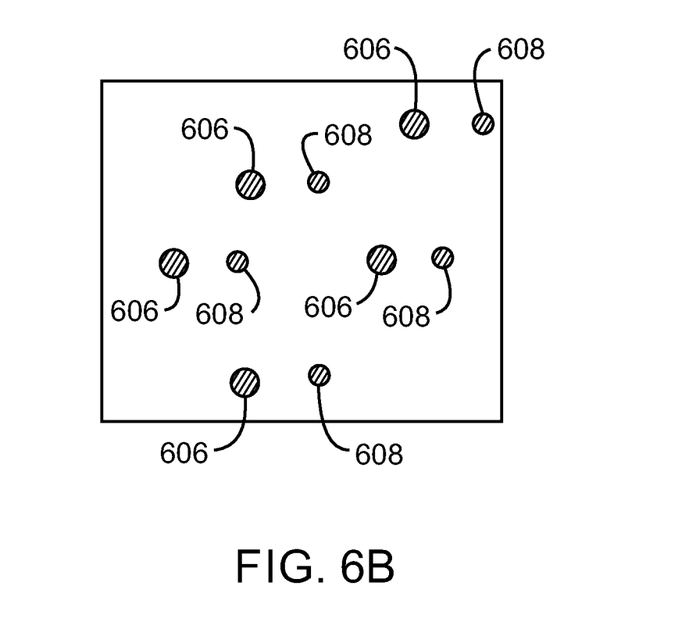

The LDW nozzle 402 provides the pattern shown in FIG. 6B. The CB gives two dots 606 and 608 of similar size. This arrangement is desirable for images, as the smaller, less visible dots of the LDW drops cover more white space providing a smoother, more uniform image with less grain. However, more dots are used to make a specific tone. Further, at higher printer speeds, the head and tail of the LDW drops may become unacceptably distant, e.g., greater than about a 600 dpi pixel size, leading to blurring of text and images. As a result, the speed of the print medium may be controlled, at least in part, by the ratio of HDW drops to LDW drops used in the printing. For example, at high ratios of HDW drops to LDW drops the speed of the line may approach a design speed, such as about 1000 feet per minute (about 300 meters per minute) or higher. At low ratios of HDW drops to LDW drops, the speed may be decreased, for example, to 800 feet per minute (244 meters per minute) or lower.

Figure 7:
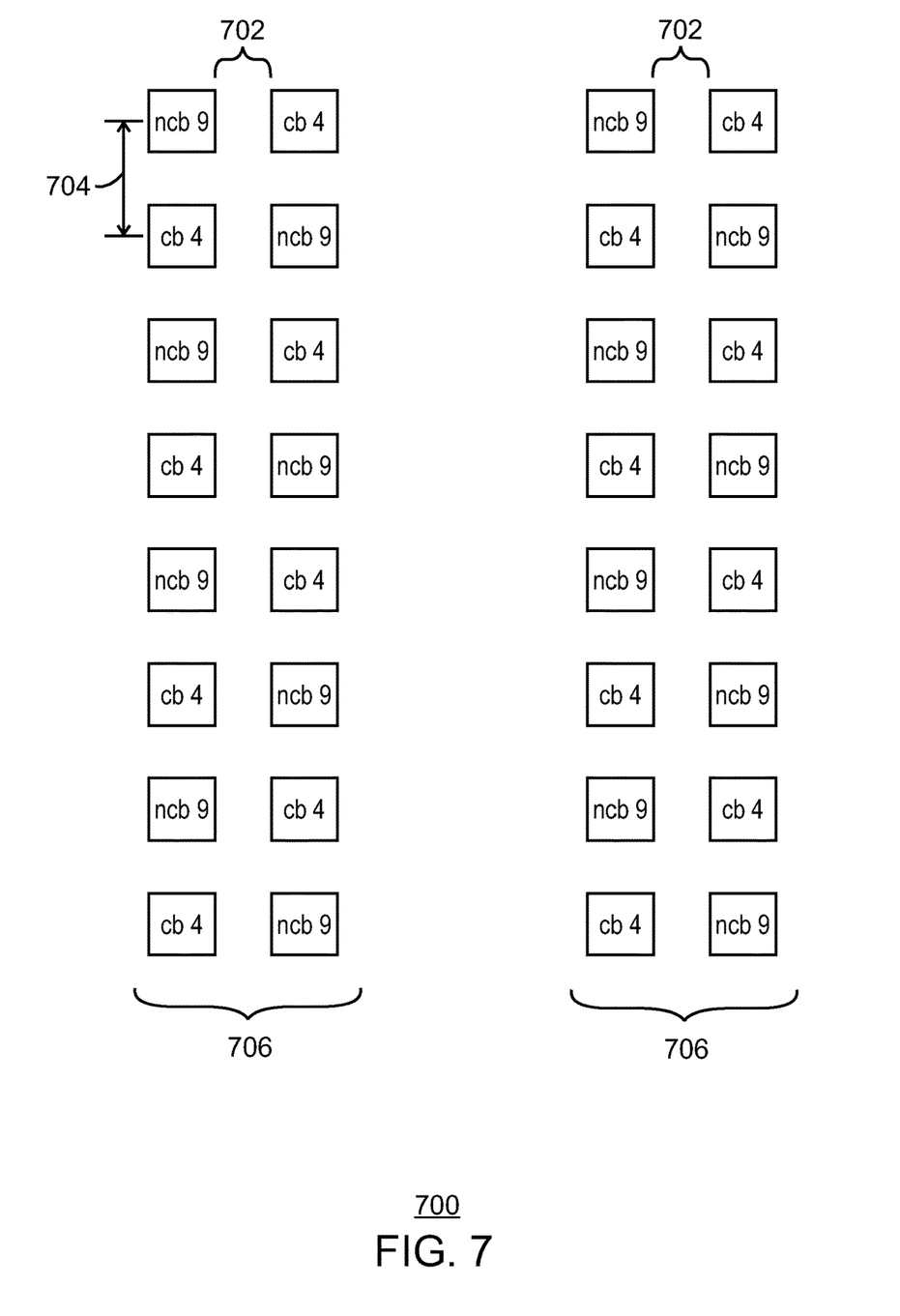
FIG. 7 is a drawing of a pattern of HDW and LDW drop generators on a printhead.

FIG. 7 is a drawing of a pattern 700 of HDW drop generators and LDW drop generators on a printhead. The nozzles of the LDW drop generators are labeled cb4, and the nozzles of the HDW drop generators are labeled ncb9. The LDW nozzles and HDW nozzles are disposed opposite each other on opposite sides of an ink feed slot 702 in the direction of motion of the print medium. By arranging the design in this way, when only the HDW nozzles are used in high speed mode, the printed Y dot pitch 704 is about 1/1200 in (1/490 cm), as HDW nozzles from both sides of the ink feed slot 702 are used. The same is true for printing using only the LDW nozzles. Each two rows of drop generators placed on each side of an ink feed slot 702 may be termed an ink slot 706.

The drop weight from a drop generator is determined for the most part by the areas of the resistor and the bore of the nozzle. Drop weight will increase as either is increased. However, the correct balance between the area of the resistor and the bore of the nozzle is necessary to obtain the correct drop velocity.

In some examples, the total pitch available for any of the LDW and HDW pairs going down a column of resistors is 21 μm. The space is partitioned between the resistor width for each drop generator and the spacing between the resistors. The spacing is determined by the minimum workable width for the epoxy that must separate the resistors of two adjacent drop generators. A minimum of 7 μm is needed for this material and thus the sum of the two resistor widths cannot exceed 28 μm. This parameter is combined with the area needed for each drop weight and the desired firing pulse, e.g., voltage and pulse width, in order to size the resistors.

Figure 8:
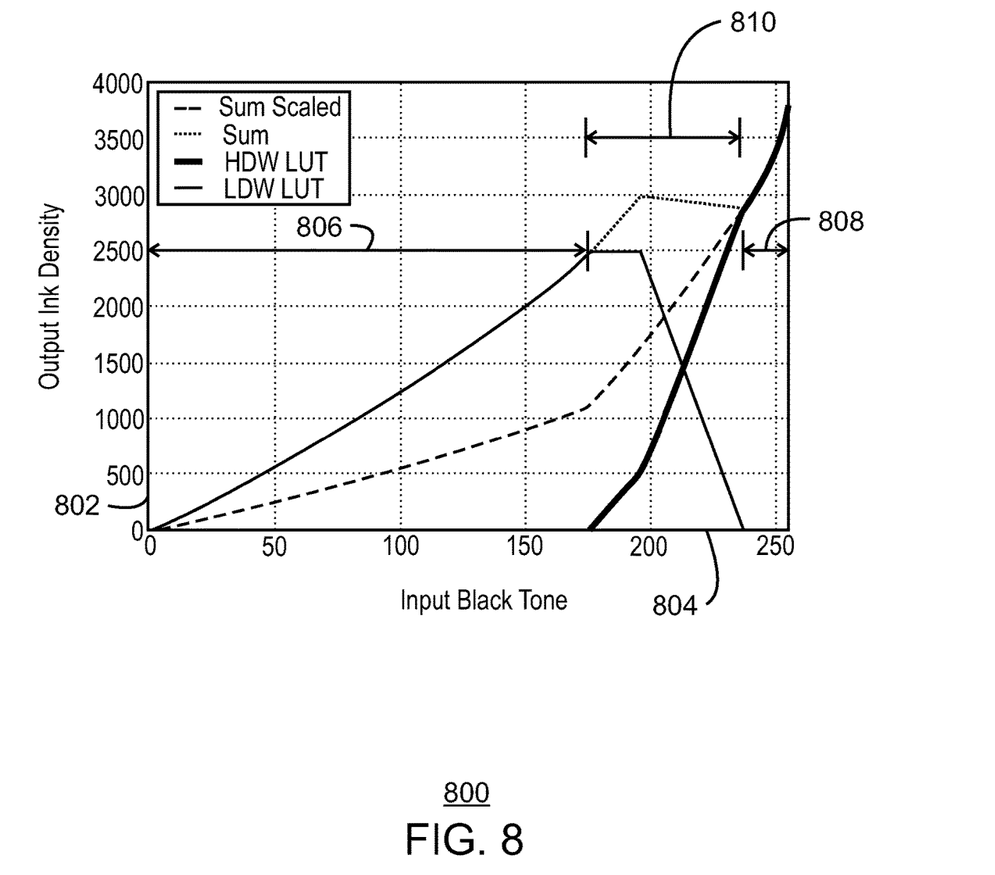
FIG. 8 is a plot of ink densities for different ink tones, which can be used to linearize the rasters, e.g., to determine which drop generators to fire.

FIG. 8 is a plot of ink densities for different ink tones, which can be used to linearize the rasters, e.g., to determine which drop generators to fire. The y-axis 802 represents the output ink density, e.g., the total amount of ink released from all of the drop generators. The x-axis 804 represents the input tone, for example, the depth of the color at each point. The example in FIG. 8 is for a black raster.

Rules can be determined by the depth of the tone in the raster and the coverage provided by each of the drop generators. For example, in the light and mid tones, as indicated by line 806, only the LDW drop generators may be used to provide smoother textures.

In dark tones, as indicated by line 808, only the HDW drop generators may be used, as the grain is not visible due to white space coverage. Further, only the HDW drop generators may be used where edges are important, e.g., for dark text and lines.

In some regions, as indicated by line 810, a combination of the LDW drop generators and HDW drop generators may be used. This may provide some advantages from both, e.g., more total ink may be provided by the HDW drop generators, while the LDW drop generators may lessen the impact of any visible grain. Because HDW drop generators and LDW drop generators are never used heavily at the same time, the average firing frequency for the whole ink slot 706 (FIG. 7) is not higher than for one drop weight by itself. On average, the LDW drop generators may be used for about 60 to 70% of the printing on a page, while the HDW drop generators may be used for about 30 to 40% of the printing on a page.

Figure 9A:
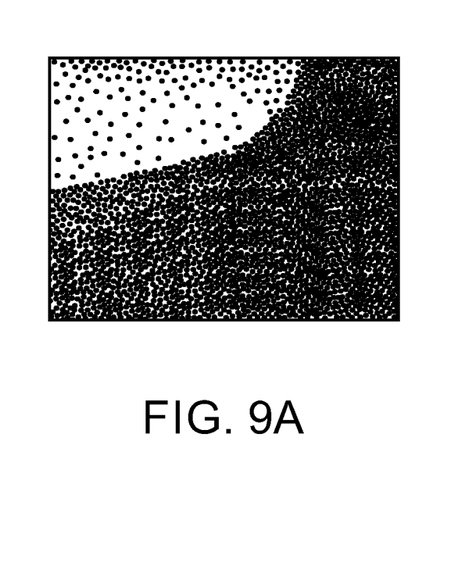
FIGS. 9A and 9B are drawings showing the difference between pictures printed with only HDW drop generators versus only LDW drop generators.
Figure 9B:
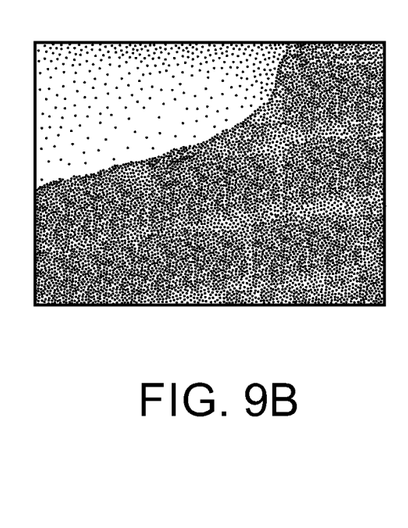

FIGS. 9A and 9B are drawings showing the difference between pictures printed with only HDW drop generators versus only LDW drop generators. The image in FIG. 9A was printed exclusively with the HDW drop generators, and shows more grain structure than the image in FIG. 9B, which was printed exclusively with the LDW drop generators.

Figure 10:
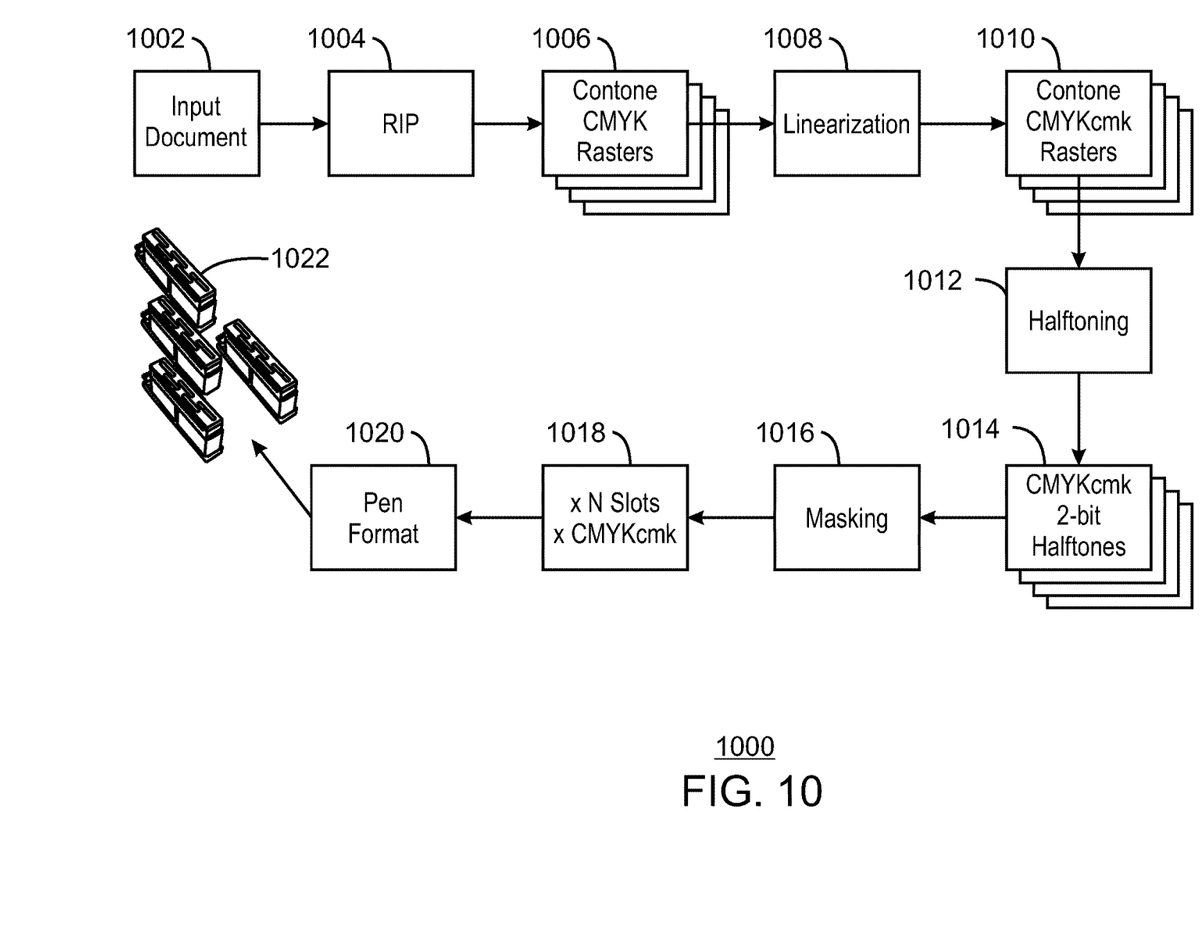
FIG. 10 is a process flow diagram of an example method to print a document using a printer that has HDW drop generators and LDW drop generators.

FIG. 10 is a process flow diagram of an example method 1000 to print a document using a printer that has HDW drop generators and LDW drop generators. Referring to FIG. 2, the method 1000 may be fully executed by the controller 220 in the ink jet printing system 200. However, in some examples, some portion or even all of the method 1000 may be executed on the host 222. The method 1000 begins at block 1002 with an input document. As described herein, the input document could be sent to the controller by the host, or may be provided by another system on a network. In some examples, a host or a controller may function as a queue, storing a number of input documents for sequential printing. At block 1004 the input document is rasterized to create color rasters 1006. As described herein, each color raster 1006 is a color plane, or image, corresponding to an ink used by the printing system.

At block 1008, the color rasters 1006 are linearized to create planes 1010 representing HDW printing and LDW printing. The linearization may be performed using rules developed from a plot of output ink density versus input tone, as described with respect to FIG. 8.

At block 1012, the HDW and LDW planes 1010 may be processed to generate halftone planes 1014. As described herein, the halftone planes 1014 represent the color intensity or tone at each position by printing 0, 1, or 2 drops of the associated drop weight, e.g., HDW drops or LDW drops. In some examples, the number of drops may be proportionally higher for the LDW drops.

At block 1016, the HDW and LDW halftone planes 1014 may be masked to create HDW and LDW printhead maps 1018, which map particular drops to particular printbars, printheads, and ink slots. At block 1020, the HDW and LDW printhead maps 1020 are merged to create a single stream of print data, which is sent to the printheads 1022.

The method 1000 described is not limited to the printhead designs shown, but may be used with other possible designs. For example, a first printhead that includes staggered rows of HDW drop generators may be in the line of motion of the print medium from a second printhead that includes LDW drop generators. In this example, each of the HDW drop generators in the first printhead may be on a dot pitch with a corresponding LDW drop generator in the second printhead. Although this arrangement, or other arrangements, would not be as desirable as the combined printheads described herein, the method 1000 could still be used to print a document in this arrangement.

The ink jet printheads described herein may be used in other applications besides two dimensional printing. For example, in three dimensional printing or digital titration, among others. In these examples, the different sizes of drop generators may be of benefit for other reasons. In digital titration, the HDW drop generator may be used to approach an end point quickly, while the LDW drop generator may be used to accurately determine the end point.

The present examples may be susceptible to various modifications and alternative forms and have been shown only for illustrative purposes. Furthermore, it is to be understood that the present techniques are not intended to be limited to the particular examples disclosed herein. Indeed, the scope of the appended claims is deemed to include all alternatives, modifications, and equivalents that are apparent to persons skilled in the art to which the disclosed subject matter pertains.

What is claimed is:

1. A method for printing a document, comprising:
rasterizing a document to create color rasters;
linearizing the color rasters to create high drop weight (HDW) planes and low drop weight (LDW) planes;
creating HDW halftone planes from the HDW planes;
creating LDW halftone planes from the LDW planes;

masking the HDW halftone planes to create HDW printhead maps;
masking the LDW halftone planes to create LDW printhead maps; and
merge the HDW printhead maps and LDW printhead maps into print data; and
send the print data to a plurality of printheads.

2. The method of claim 1, wherein the document includes an image, a text, a graphic, or any combinations thereof.

3. The method of claim 1, comprising:
determining an output ink density as a function of input tone from the color rasters; and
using the result to divide the color rasters into HDW planes and LDW planes.

4. The method of claim 1, comprising printing graphical images using more LDW drop generators than HDW drop generators.

5. The method of claim 1, comprising printing text using more HDW drop generators than LDW generators.

6. The method of claim 1, comprising providing a print head that comprises ink nozzles configured to eject an HDW drop, an LDW drop, or both, in a line of a paper motion.

7. The method of claim 1, comprising:
determining a color tone at a location in an HDW plane or an LDW plane; and
placing a 0, 1, or 2 at the location, based, at least in part, on the color tone to create a corresponding HDW halftone plane or LDW halftone plane, wherein the 0, 1, or 2 represents the number of HDW or LDW drops to be printed at the location.

8. The method of claim 1, comprising creating four color rasters from the document.

9. The method of claim 8, wherein the four color rasters correspond to cyan-magenta-yellow-black (CMYK) inks.

10. A printing system, comprising:
a processor; and
storage, wherein the storage comprises code configured to direct the processor to:
rasterize a document to create color rasters;
linearize the color rasters to create high drop weight (HDW) planes and low drop weight (LDW) planes;
halftone the HDW planes to create HDW halftone planes;
halftone the LDW planes to create LDW halftone planes;
mask the HDW halftone planes to create HDW printhead maps;
mask the LDW halftone planes to create LDW printhead maps; and
merge the HDW printhead maps and LDW printhead maps into print data; and
send the print data to a plurality of printheads.

11. The printing system of claim 10, comprising a plurality of printheads wherein each printhead comprises a plurality of drop generators disposed in a first array and a second array, wherein:
the drop generators in the first array are spaced one dot pitch apart perpendicular to a motion of a print medium, and alternate between a high drop weight (HDW) drop generator and a low drop weight (LDW) drop generator;
the drop generators in the second array are spaced one dot pitch apart perpendicular to the motion of the print medium and alternate between an LDW drop generator and an HDW drop generator; and
each drop generator in the first array is in a line of the motion of the print medium with a corresponding drop generator in the second array, wherein each HDW drop generator in the first array is in line with an LDW drop generator in the second array, and each LDW drop generator in the first array is in a line of the motion of the print medium with an HDW drop generator in the second array.

12. The printing system of claim 11, wherein the nozzle with the NCB is in the shape of a two-lobed polynomial ellipse.

13. The printing system of claim 10, comprising a plurality of nozzles configured to eject ink drops of different sizes wherein a low drop weight (LDW) drop is ejected through a nozzle with a circular bore (CB), and a high drop weight (HDW) drop is ejected through a nozzle with a non-circular bore (NCB).

14. The printing system of claim 10, comprising a printbar comprising a plurality of printheads in a fixed position over a print media.

15. The printing system of claim 10, comprising a plurality of printheads wherein each printhead comprises a plurality of high drop weight (HDW) drop generators and low drop weight (LDW) drop generators, the HDW drop generators and LDW drop generators being spaced at a same pitch.

16. The printing system of claim 10, wherein the color rasters comprise four rasters corresponding respectively to cyan-magenta-yellow-black (CMYK) inks.

17. The printing system of claim 10, further comprising a breakpoint table for halftoning, the breakpoint table to convert a continuous color tone of each of the HDW and LDW planes into individual drops.

18. The printing system of claim 10, further comprising a plurality of nozzles configured to eject ink drops of different sizes wherein a high drop weight (HDW) drop is ejected through a nozzle with a non-circular bore (NCB).

19. A non-transitory, machine readable medium, comprising code configured to direct a processor to:
rasterize a document to create color rasters;
linearize the color rasters to create high drop weight (HDW) planes and low drop weight (LDW) planes;
halftone the HDW planes to create HDW halftone planes;
halftone the LDW planes to create LDW halftone planes;
mask the HDW halftone planes to create HDW printhead maps;
mask the LDW halftone planes to create LDW printhead maps; and
merge the HDW printhead maps and LDW printhead maps into print data; and
send the print data to a plurality of printheads.

20. The machine readable medium of claim 19, wherein the HDW printhead map for each color raster is merged with the LDW printhead map for a same color raster.

* * * * *